(No Model.)
J. A. WATHEN.
WATER PURIFIER AND HEATER.
No. 512,076. Patented Jan. 2, 1894.
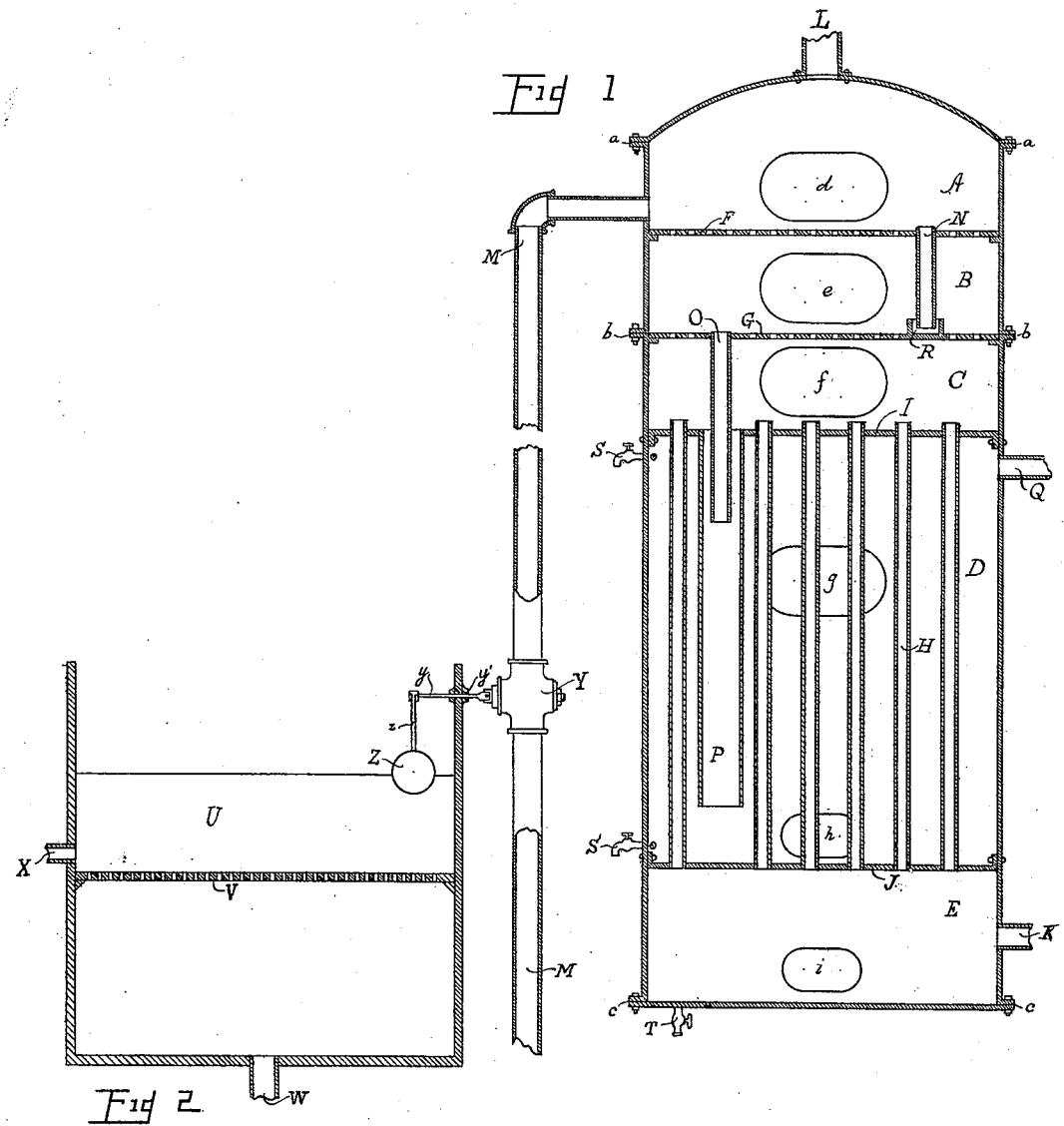
WITNESSES:
H. R. Phillips
James W. Beattie
INVENTOR
James A. Wathen

UNITED STATES PATENT OFFICE.

JAMES A. WATHEN, OF LOUISVILLE, KENTUCKY.

WATER PURIFIER AND HEATER.

SPECIFICATION forming part of Letters Patent No. 512,076, dated January 2, 1894.

Application filed April 21, 1893. Serial No. 471,301. (No model.)

*To all whom it may concern:*

Be it known that I, JAMES A. WATHEN, a citizen of the United States, residing at Louisville, in the county of Jefferson and State of Kentucky, have invented certain new and useful Improvements in Water Purifiers and Heaters; and I do hereby declare the following to be a full, clear, and exact description of the invention, such as will enable others skilled in the art to which it appertains to make and use the same.

My invention relates to the purifying of water for steam boilers by exhaust steam, which also at the same time heats the water and saves fuel in converting it into steam.

In the accompanying drawings Figure 1. is a vertical sectional view of my water settler and heater and Fig. 2 is a like view of a tank containing a filter in its lower portion, which is used for further purifying and also for storing the water until it is needed.

Fig. 1 is a chamber, divided into sections so that it can be readily taken apart for cleaning, and fastened together by being bolted through the flanges $a$, $b$ and $c$. The chamber consists of five or more divisions designated by the letters A, B, C, D, E. More divisions constructed like division B may be added next above it. F and G are partitions, which are perforated to allow the steam to pass through them, and heat the water in divisions A and B, and causing it to deposit some of its impurities. The perforations in the partitions F and G are of such size that the pressure of the steam prevents the water from passing through them. H are steam flues passing from the partition J to and slightly above the partition I, so as to exclude from the flues any water which may enter division C. The partitions I and J are fixed to the chamber by being flanged and riveted. K is the exhaust steam inlet pipe and L its outlet pipe. M is the water supply pipe, and N, O, and P are pipes which conduct it through the chamber. Q is the water outlet pipe, which is connected to the pipe W, Fig. 2, of the reservoir. R is a cup to prevent the entrance of steam into the pipe N, and the pipe O is extended into the pipe P, below the level of the water outlet Q, for a like purpose. S is a cock for blowing off the scum and S' a cock to remove the mud or other sediment collecting in the division D. T is a cock to draw off the oil or other fluids, which may collect from the steam in the division E. $d$, $e$, $f$, $g$ are manholes and $h$ and $i$ are handholes, through which the sediment, deposited in the divisions by water or steam, is removed. The construction of the chamber allows the partitions F and G, which rest upon lugs, to be taken out when desired.

In Fig. 2, U is the reservoir tank, divided by a perforated partition V, beneath which is placed some suitable filtering material such as hay. W is the water inlet pipe, which is connected with the pipe Q of the chamber. X is the outlet pipe, through which the water is pumped to the boiler when needed. Y is a valve in the supply pipe M to regulate the flow of water into the chamber, so as to prevent the reservoir from overflowing. The rod $y$ passes from the valve Y through the stuffing box $y'$ to the stem $z$ of the float Z. This float rises and falls with the level of the water in the reservoir and closes or opens the valve Y.

In use the exhaust steam passes from the inlet pipe K into the division E, through the flues H, the division C, the perforations in the partitions G and F into divisions B and A, and out of the escape pipe L. The water passes from the supply pipe M into the division A, through the pipe N into the division B, through the pipes O and P into the lower part of the division D and out of the upper portion of this division through the pipe Q. The water is thus heated by the steam in divisions A and B, which causes it to deposit some of its impurities. It then passes into the division D, where it is further heated by the steam flues H, and remains quiescent, so that the greater portion of the remaining impurities are deposited upon the partition J. It next passes through the pipes Q and W into the filtering material in the lower portion of the tank U, which further purifies the water, and through the perforations in the platform V into the upper portion of the tank, in which it remains until needed.

The advantages of my invention are, that the water is thoroughly settled, purified and filtered so as to be suitable for use in a steam boiler; that it is heated by the exhaust steam and thus saves fuel, and that the chamber can be readily cleaned of all sediment, deposited upon the partitions, by means of the manholes, handholes and cocks, and by taking the sections apart and lifting out the perforated partitions.

Having fully described my invention, what I claim as new, and desire to secure by Letters Patent, is—

1. In a water settler and heater consisting of flanged sections, containing divisions the combination of the partitions F and G, which are perforated for the passage of steam, the pipes M, N, O, P and Q and the cup R for conducting the water, and the pipes K and L and steam flues H for heating the water substantially as and for the purpose set forth.

2. In a water settler and heater consisting of flanged sections containing divisions the combination of an inlet pipe K, the flues H, the perforated partitions G and F and an outlet pipe L for the passage of steam through the chamber, with a supply pipe M, the pipes N, O, and P, a cup R and an outlet pipe Q for the passage of water through the chamber substantially as and for the purpose set forth.

3. A water settler and heater comprising a series of removably connected flanged sections, and having the divisions and man and hand holes as described, the removable perforated partitions, cocks for drawing off the sediment and scum, the flues H, water conducting pipes N, O, P, a water supply pipe having a valve, a tank for storing the water having a filter and a perforated diaphragm above the same, and a float in said tank operated by the stored water to control the valve, substantially as and for the purpose set forth.

In testimony whereof I affix my signature in presence of two witnesses.

JAMES A. WATHEN.

Witnesses:
H. R. PHILLIPS,
JAMES W. BEATTIE.